June 23, 1970  J. E. MOFFITT  3,516,575
SYSTEM FOR INDENTIFYING AND FEEDING ANIMALS
Filed June 18, 1968  2 Sheets-Sheet 1
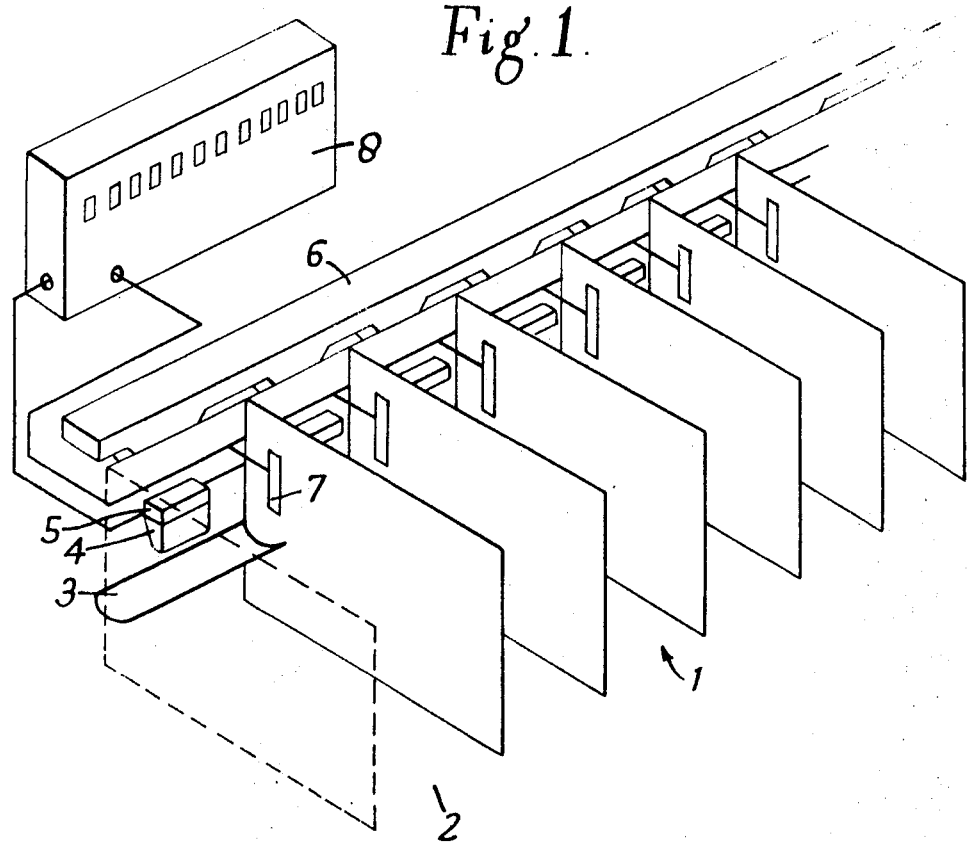
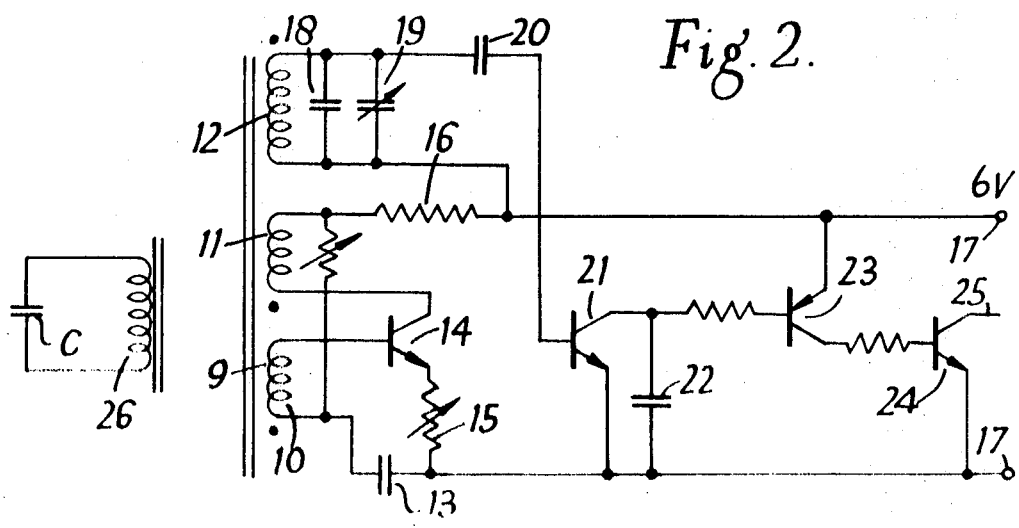

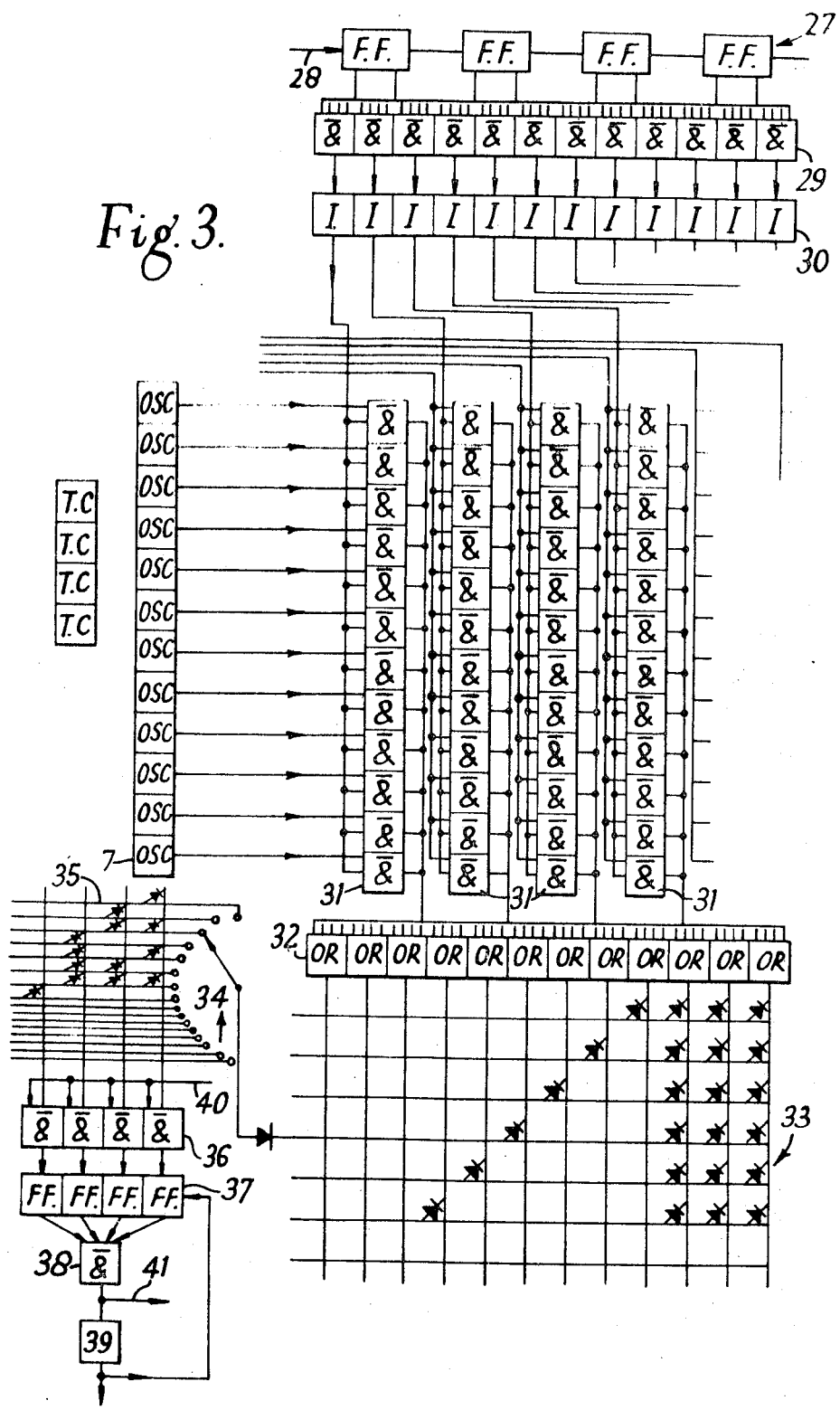

United States Patent Office 3,516,575
Patented June 23, 1970

3,516,575
SYSTEM FOR IDENTIFYING AND FEEDING ANIMALS
John Edward Moffitt, Peepys Farm, Stockfield, Northumberland, England
Filed June 18, 1968, Ser. No. 738,056
Claims priority, application Great Britain, June 20, 1967, 28,286/67
Int. Cl. B67d 5/14; G06k 9/00
U.S. Cl. 222—52     5 Claims

ABSTRACT OF THE DISCLOSURE

A system for identifying which of a number of animals is at a particular stall, and for feeding the identified animal at said stall. The system operates on a set of electro-magnetically radiated signals of discrete frequencies, and has, at the stall a set of frequency conscious circuits responsive respectively to each of the set of operating frequencies. On each animal to be identified is a group of frequency conscious circuits complementary in type to the frequency conscious circuit of the sets, the circuits of each group being responsive to different frequencies, and the frequencies of each group constituting a unique combination. The circuits of the set and the group will interact when an animal is at the stall to give a unique combination of output signals. Means is provided for analyzing the output signals to identify the particular animal which is at the stall.

---

The invention relates on an identification system for identifying which of a number of animals is at a particular stall.

According to the invention there is provided such a system operating on a set of electro-magnetically radiated signals of discrete frequencies and comprising: at the stall, a set of frequency conscious circuits responsive respectively to each of the set of operating frequencies; on each object to be identified a group of frequency conscious circuits complementary in type to the frequency conscious circuits of said set, the circuits of each group being responsive to different frequencies and the frequencies of each group constituting a unique combination, the circuits of the set and the group interacting when an animal is at the stall to give a unique combination of output signals; and means for analysing the output signals to identify the particular animal at the stall. The system further includes means for dispensing food individually to the stalls and program means for each animal upon which may be set up the food requirements therefor, the analysing means being arranged to select the program means appropriate to the animal at the stall, whereby the program means controls the means for dispensing food so that the amount of food appropriate to the animal is dispensed.

Preferably, the frequency conscious circuits are respectively oscillators and passive tuned circuits, and preferably the oscillators are in said set of circuits and the passive tuned circuits are in said groups of circuits.

The interaction of the oscillators and the tuned circuits is preferably such that the tuned circuits, when in proximity to the oscillators, constitute a load on the oscillating circuit of appropriate frequency and thereby damp the oscillations thereof. The oscillating circuits are arranged to be critically tuned so that their oscillations cease on such damping and preferably D.C. output signals are derived from the oscillators in accordance with whether they are oscillating or not.

In a preferred embodiment of the invention there is a plurality of stalls, each having a similar set of frequency conscious circuits, there being provided distinguishing means for distinguishing the outputs from the different sets in order to determine the identity of an object at each stall. Preferably, the distinguishing means comprises means for scanning the outputs from the different sets in order to determine, in turn, the identity of an animal at each stall.

The invention finds application in equipment for performing a controlled operation on a number of animals according to the individual requirements of the animals. For example, equipment may be provided for milking a number of cows at a number of stalls and at the same time dispensing food to the cows in accordance with their individual requirements. To this end, it is necessary to identify the cows at the particular stalls in order to prevent under-feeding or over-feeding of a particular cow. Thus, in accordance with such an embodiment of the invention the system preferably includes means for dispensing food individually in the stalls and program means for each animal upon which may be set up the food requirements therefor, said analysing means being arranged to select the program means appropriate to the animal at the stall whereby the program means controls the means for dispensing food so that the amount of food appropriate to that animal is dispensed.

The number of discrete frequencies used and the number of stalls will be dependent upon the number of cows in the herd. As an example, it is proposed that with a herd of some 400 cows there is provided equipment with twelve feeding and milking stalls each provided with a set of twelve oscillators operating on different frequencies. Each cow has a group of four passive tuned circuits fixed thereto. With such an arrangement it is possible to distinguish between a maximum of 495 cows.

While it is preferred to arrange that all the cows have the same number of tuned circuits, it is envisaged that the various groups may have different numbers of tuned circuits therein giving a greater number of unique combinations of frequencies for a given number of operating frequencies. The advantage of arranging that each group has the same number of frequency conscious circuits is that the apparatus is thereby simplified somewhat and, furthermore, it is possible to effect a parity check on the outputs from the oscillators so that if, from any set of oscillators, there are obtained outputs from more or less than the fixed number of oscillators then it is known that there is a fault.

The invention will further be described hereinafter with reference to the accompanying drawings of which:

FIG. 1 is a schematic illustration of cow milking and feeding equipment embodying the invention;

FIG. 2 is a circuit diagram of an oscillator of the FIG. 1 arrangement; and

FIG. 3 is a block circuit diagram of the analysing means for identifying cows.

Referring to FIG. 1 the equipment comprises a series 1 of twelve cow stalls, of which only one is shown in detail. It is to be understood that the remaining stalls are identical. The stalls are open ended at 2 and at the other end have a feed trough 3, a feed supply chute 4 and a feed control device 5. Feed is distributed in a common hopper channel 6 and is released in a predetermined quantity into trough 3 by control of device 5. In a manner to be described the device 5 is controlled in accordance with the requirements of a particular cow in the stall. The stalls also have automatic milking devices of a known kind (not shown) which milk the cow as it is feeding.

Each stall has an oscillator unit 7 which comprises a set of twelve oscillators arranged to oscillate at twelve different frequencies. In this example the lowest of the twelve frequencies is 10 kHz. and the frequency spacings are such that the frequencies rise in a geometric progression thus: 10 kHz.; 15 kHz.; 22.5 kHz.; 33.75 kHz. etc. Each cow is fitted with a collar to which is fixed an encapsulated unit including a group of four tuned circuits. On each cow the tuned circuits are tuned to a particular unique group of the oscillator frequencies. When a cow enters the stall the tuned circuits on its collar approach the oscillator unit 7 and four of the oscillators therein are damped by the tuned circuits and cease to oscillate. Signals representative of this condition are passed to a control unit 8 which analyses the output signals from the oscillators and, in accordance therewith, controls the feed control device 5 to dispense the correct amount of food for the particular cow in the stall.

The control unit 8 includes scanning means whereby the stalls are selected in turn for analysis of the outputs from the oscillator units. When a stall is selected the oscillator outputs determine the feed output to unit 5 in accordance with the particular cow, and the appropriate amount of feed—from 1 lb. to 16 lbs. is dispensed. As soon as the dispensing cycle is started the unit 8 proceeds to the next step in its scan and analyses the outputs from the oscillator unit of the next stall.

Referring now to FIG. 2 there is shown a circuit diagram of an oscillator and a corresponding tuned circuit. The oscillator shown in FIG. 2 is one of twelve included in each oscillator unit 7 (FIG. 1). The oscillator comprises a ferrite core 9 on which are wound a winding 10 of four turns, a winding 11 of fourteen turns, and a winding 12 of one-hundred and fifty turns. Winding 10 is connected in series with a capacitor 13 in the base-emitter circuit of an oscillating circuit transistor 14. A variable resistor 15 in the emitter circuit of the transistor helps to adjust the oscillating characteristics of the circuit. Winding 11 is connected in the collector circuit of the transistor, the circuit being completed through a fixed resistor 16 to the terminals 17 of a six volt supply potential source. The oscillating frequency of the oscillator is determined by the tuned circuit constituted by winding 12 and a capacitor 18 in parallel therewith. A trimming capacitor 19 is connected across capacitor 18 to effect fine tuning. This tuned circuit interacts with the feed-back path from collector to base of the transistor, so determining the oscillating frequency of the circuit.

Output from the tuned circuit constituted by winding 12 and capacitors 18 and 19 is derived through a further capacitor 20 and applied to the base of a transistor 21 arranged to provide at its collector a rectified form of the input signal applied to its base. If the circuit is oscillating a positive potential is derived across the smoothing capacitor 22 and a corresponding current is applied to a further transistor 23 which conducts a response thereto and causes a further transistor 24 to conduct also. This gives a characteristic output current in the output line 25. If the circuit ceases to operate the characteristic output current in line 25 is removed.

The oscillator is critically tuned by means of a variable resistor 26, the arrangement being such that the circuit just maintains oscillation under normal circumstances. However, if there is brought into proximity to the oscillator a passive tuned circuit of the kind illustrated constituted by a winding 26 of two-hundred and fifty turns on a ferrite core in parallel with a capacitor C tuned to the oscillating frequency, then the oscillator will be damped thereby and will cease to oscillate. This condition prevails if a cow enters the stall carrying in its group of tuned circuits a circuit tuned to the oscillator frequency.

Referring now to FIG. 3 there is shown the block diagram of the control circuit 8 of FIG. 1. A stall select circuit comprises a series 27 of four flip-flop circuits arranged as a binary counter to count input pulses appearing on an input line 28. The output states of the four circuits are fed to a series of twelve NAND gates 29 each having four inputs and arranged to constitute a binary to duo-decimal converter. In response to each input pulse or input 28 an output is derived in turn from one and only one of the NAND gates 29. These gates correspond respectively to the twelve stalls and a series of twelve indicators 30 is arranged to indicate at any time which particular stall is being monitored.

Twelve sets 31 of two-input NAND gates are connected to the output from NAND gates 29 so that all the NAND gates of each set 31 receives an input from a respective one of the NAND gates 29. The other inputs for the NAND gates of each set are derived from respective members of a respective set 7 of oscillators. For example, the outputs from the oscillators of the first stall are connected to respective inputs of the NAND gates of the first set 31. The outputs of the oscillators for the second stall are connected to respective inputs of the second set 31 of NAND gates, and so on.

When a particular stall is being monitored each NAND gate of the appropriate set 31 receives one input. When there is a cow in the stall four of the NAND gates of that set also receive another input. Each NAND gate which receives two inputs gives an output. The outputs from the NAND gates of the sets 31 are applied to a series of twelve OR gates 32. The arrangement is such that the outputs from the first NAND gates of the sets 31 are applied to the respective input terminals of he first OR gate 32. The outputs from the second NAND gates of the sets 31 are applied respectively to input terminal of the second OR gate 32 and so on. In this way, when a stall is monitored and a cow is in the stall four of the OR gates 32 will respond in a pattern characteristic of the particular cow. The outputs from the OR gates 32 are applied to a diode de-coding matrix 33 having twelve input (vertical) lines and four-hundred corresponding to the number of cows—output (horizontal) lines. The connections of the diodes in the matrix are such that for each unique combination four outputs from the OR gates 32 there is provided a single output on one of the output lines. This selects the output line characteristic of the appropriate cow.

Each output line of the de-coding matrix 33 is connected to the wiper of a sixteen-position rotary switch, one of which is shown at 34. The position of the wiper of switch 34 is set manually to a setting corresponding to the food requirements of the cow to which the switch corresponds. By appropriate positioning of the wiper of the switch the cow may be given from one to sixteen pounds of food. Associated with each switch is a diode decoding matrix 35 which has sixteen input lines (horizontal) connected respectively to the contacts of the switch and four output lines (vertical).

Associated with each of the stalls is a feed device controller comprising a set of four NAND gates 36 a set of four flip-flops 37, a four input NAND gate 38 and a drive motor 39 which drives the feed device 5 (FIG. 1). One input to each of the NAND gates 36 is derived from a respective output line of the de-coding matrix 35. The other inputs are derived in common from an input 40 connected to the stall select circuit 27, 28, 29. The input 40 for a particular stall is energised only if that stall is being monitored at any particular time, as determined by the stall select circuit. Thus if, and only if, the appropriate stall is being monitored, the outputs from matrix 35 appropriate to the cow being detected are applied to set the series 37 of four flip-flops.

NAND gate 38 is connected to four outputs of the series 37 of flip-flops in such a way as to give a positive output signal at all times except when the count registered by the flip-flops is zero. Thus, when the series 37 is set by detection of a cow at the stall to a level appropriate to the amount of food required by the cow an output is given by gate 38 to motor 39. A switch (not shown) associated with the feed drive motor gives an output pulse as each unit of food is dispensed. These pulses are fed back to the series 37 of flip-flops as input pulses which are counted downwards in a binary manner until zero is reached again. When zero is reached gate 38 ceases to give an output and the feed stops. Thus, it will be seen that food is supplied to the trough in the appropriate stall in an amount determined by the setting of switch 34 corresponding to the particular cow which has been detected.

The pulses which are counted by the flip-flop counter 27 are derived from NAND gate 38, one pulse being provided over a line 41, which is connected to line 28, each time a positive output is given by NAND gate 38. Similar output lines to line 41 from the other stall feed arrangements are connected in common to the input line 28. Thus, the stall being monitored is changed to the next when feed delivery is started.

The invention is not restricted to the details of the foregoing description made with reference to the drawings. For example, instead of being arranged as shown, the stalls may be arranged around the periphery of a slowly rotating platform which the cows can mount from a single entry point to be carried around to a single exit point while they are fed and milked. The invention could be applied to other animals or to inanimate objects whose position in relation to particular locations is required to be known. It is envisaged that the objects themselves may carry the oscillating circuits and the stalls (locations) could house the passive tuned circuits. With this arrangement detection of response of the tuned circuits to the oscillators could be made and analysed. Thus, each cow could carry four oscillators and twelve passive circuits could be arranged in each stall. Alternatively, each cow could carry twelve oscillators and four passive circuits could be arranged in each stall, means being provided for transmitting the responses of the oscillators to the analysing means.

I claim:

1. A system for identifying which of a number of animals is at a particular stall and for feeding the identified animal at said stall, the system operating on a set of electro-magnetically radiated signals of discrete frequencies and comprising; at the stall, a set of frequency conscious circuits responsive respectively to each of the set of operating frequencies; on each animal to be identified a group of frequency conscious circuits complementary in type of the frequency conscious circuits of said set, the circuits of each group being responsive to different frequencies and the frequencies of each group constituting a unique combination, the circuits of the set and the group interacting when an animal is at the stall to give a unique combination of output signals; means for analysing the output signals to identify the particular animal at the stall; and means for dispensing food individually to the stalls and program means for each animal upon which may be set up the food requirements therefor, said analysing means being arranged to select the program means appropriate to the animal at the stall, whereby the program means controls the means for dispensing food so that the amount of food appropriate to the animal is dispensed.

2. A system as claimed in claim 1 wherein the frequency conscious circuits of said set are oscillators and the frequency conscious circuits of said groups are passive tuned circuits.

3. A system as claimed in claim 1 wherein there is a plurality of stalls, each having a similar set of frequency conscious circuits, there being provided distinguishing means for distinguishing the outputs from the different sets in order to determine the identity of an animal at each stall.

4. A system as claimed in claim 3 wherein the distinguishing mean comprises means for scanning the outputs from the different sets in order to determine, in turn the identity of an animal at each stall.

5. A system as claimed in claim 1 wherein the program means comprises a multi-position switch for each animal which is energised on detection of its associated animal and which, on being energised sets a counter in accordance with its own setting which is manually controllable, the counter forming part of the food dispensing means and being arranged to count to its setting the number of units of food dispensed and then stop the dispensing.

References Cited
UNITED STATES PATENTS

| | | | |
|---|---|---|---|
| 2,122,358 | 6/1938 | Preston | 340—146.3 X |
| 2,673,292 | 3/1954 | Treharne | 340—146.3 X |
| 2,693,525 | 11/1954 | Kendall et al. | 340—146.3 X |
| 3,056,126 | 9/1962 | Preston | 340—146.3 X |
| 3,072,899 | 1/1963 | Kleist et al. | 340—23 |
| 3,180,321 | 4/1965 | Aldinger | 119—51 |

ROBERT B. REEVES, Primary Examiner

HADD S. LANE, Assistant Examiner

U.S. Cl. X.R.

119—51; 222—76, 144.5; 340—146.3